(12) United States Patent
Ono

(10) Patent No.: US 8,155,469 B2
(45) Date of Patent: Apr. 10, 2012

(54) FILTER CIRCUIT, IMAGE PROCESSING CIRCUIT, AND FILTERING METHOD

(75) Inventor: Yoshiyuki Ono, Tokyo-to (JP)

(73) Assignee: Seiko Epson Corporation, Tokyo (JP)

( * ) Notice: Subject to any disclaimer, the term of this patent is extended or adjusted under 35 U.S.C. 154(b) by 1179 days.

(21) Appl. No.: 11/976,695

(22) Filed: Oct. 26, 2007

(65) Prior Publication Data

US 2008/0101714 A1  May 1, 2008

(30) Foreign Application Priority Data

Oct. 31, 2006  (JP) ................. 2006-296266

(51) Int. Cl.
G06F 17/00 (2006.01)
G06F 15/00 (2006.01)
G06F 7/48 (2006.01)
G06F 7/38 (2006.01)
G06K 9/40 (2006.01)
G06K 9/64 (2006.01)
H04N 7/01 (2006.01)
H04N 11/20 (2006.01)
H04N 9/74 (2006.01)
H04N 9/64 (2006.01)
G06T 1/00 (2006.01)
G06T 1/60 (2006.01)
G09G 5/37 (2006.01)
G06J 1/00 (2006.01)
H04N 5/235 (2006.01)
H04N 5/228 (2006.01)
G06K 9/32 (2006.01)

(52) U.S. Cl. ........ 382/261; 382/254; 382/279; 382/293; 345/501; 345/530; 345/561; 348/222.1; 348/441; 348/580; 348/720; 708/190; 708/230; 708/300; 708/490

(58) Field of Classification Search ............... 382/100, 382/254–275; 348/222.1, 441, 448–452, 348/571, 580–581, 720; 345/501, 530, 561; 708/1, 3, 5, 7, 190, 208–209, 230–233, 290, 708/300, 315–316, 322, 420, 445, 490
See application file for complete search history.

(56) References Cited

U.S. PATENT DOCUMENTS 4,602,285 A * 7/1986 Beaulier et al. ............ 348/580
(Continued)

FOREIGN PATENT DOCUMENTS

EP  0 762 295 A2  3/1997
(Continued)

OTHER PUBLICATIONS

Bin Nun et al., "A Modular Approach to the Hardware Implementation of Digital Filters," The Radio and Electronic Engineer, vol. 46, No. 8/9, pp. 393-400, (1976).
(Continued)

Primary Examiner — Anand Bhatnagar
Assistant Examiner — Nathan Bloom
(74) Attorney, Agent, or Firm — Oliff & Berridge, PLC

(57) ABSTRACT

A filter circuit includes: an adder/subtractor that performs at least addition; and a shifter that performs multiplication/division by a power of two through a shift operation. The adder/subtractors and the shifter are configured to obtain a first calculation result representing a pixel value of a target pixel included in image data multiplied by a first filter coefficient. At least the adder/subtractors and the shifter is configured to obtain a second calculation result representing pixel values of a plurality of peripheral pixels adjacent to the target pixel, with each of the pixel values being multiplied by a second filter coefficient. The adder/subtractor is configured obtain a third calculation result by adding the first and second calculation results. The shifter configured to divide the third calculation result by a power of two which is equivalent to a sum of the first and second filter coefficients, so as to output the division result. According to this aspect of the present invention, adders and subtractors, which have a lower cost and lower energy consumption than multipliers and dividers, are used along with shifters. It is therefore possible to realize the smoothing of images at low cost and low energy consumption.

9 Claims, 4 Drawing Sheets

| | FILTER COEFFICIENT | LEFT FILTER COEFFICIENT PERCENTAGE | CENTRAL FILTER COEFFICIENT PERCENTAGE | RIGHT FILTER COEFFICIENT PERCENTAGE | REQUIRED NUMBER OF ADDERS/ SUBTRACTORS |
|---|---|---|---|---|---|
| FIRST FILTER CIRCUIT | 1:2:1 | 0.250 | 0.500 | 0.250 | 2 |
| SECOND FILTER CIRCUIT | 7:18:7 | 0.219 | 0.563 | 0.219 | 4 |
| THIRD FILTER CIRCUIT | 3:10:3 | 0.188 | 0.625 | 0.188 | 4 |
| FOURTH FILTER CIRCUIT | 5:22:5 | 0.156 | 0.688 | 0.156 | 5 |
| FIFTH FILTER CIRCUIT | 1:6:1 | 0.125 | 0.750 | 0.125 | 3 |
| SIXTH FILTER CIRCUIT | 3:26:3 | 0.094 | 0.813 | 0.094 | 5 |
| SEVENTH FILTER CIRCUIT | 1:14:1 | 0.063 | 0.875 | 0.063 | 3 |
| EIGHTH FILTER CIRCUIT | 1:30:1 | 0.031 | 0.938 | 0.031 | 3 |

U.S. PATENT DOCUMENTS

| | | | |
|---|---|---|---|
| 5,287,299 A | | 2/1994 | Lin |
| 5,537,150 A | | 7/1996 | Sugiyama et al. |
| 6,091,426 A | * | 7/2000 | Hauck et al. .................. 345/619 |
| 6,819,717 B1 | * | 11/2004 | Sasai et al. ............... 375/240.29 |
| 2003/0044088 A1 | * | 3/2003 | Wright .......................... 382/300 |
| 2003/0169944 A1 | * | 9/2003 | Dowski et al. ............... 382/279 |
| 2004/0001234 A1 | * | 1/2004 | Curry et al. .................. 358/3.08 |
| 2005/0182803 A1 | * | 8/2005 | Claassen et al. ............. 708/300 |
| 2006/0104538 A1 | | 5/2006 | Izumi |
| 2007/0071352 A1 | * | 3/2007 | Brown Elliott et al. ...... 382/261 |

FOREIGN PATENT DOCUMENTS

| | | |
|---|---|---|
| JP | A-56-140461 | 11/1981 |
| JP | A-03-105484 | 5/1991 |
| JP | A-3-105484 | 5/1991 |
| JP | A-03-157062 | 7/1991 |
| JP | A-06-038188 | 2/1994 |
| JP | A-06-078296 | 3/1994 |
| JP | A-6-180568 | 6/1994 |
| JP | A-06-180568 | 6/1994 |
| JP | A-2000-333171 | 11/2000 |
| JP | A-2002-259960 | 9/2002 |
| JP | A-2003-150955 | 5/2003 |
| JP | A-2006-140818 | 6/2006 |
| WO | WO 93/24879 A1 | 12/1993 |

OTHER PUBLICATIONS

Feb. 5, 2010 Extended European Search Report issued in European Patent Application No. 07 02 1248.

* cited by examiner

| | FILTER COEFFICIENT | LEFT FILTER COEFFICIENT PERCENTAGE | CENTRAL FILTER COEFFICIENT PERCENTAGE | RIGHT FILTER COEFFICIENT PERCENTAGE | REQUIRED NUMBER OF ADDERS/ SUBTRACTORS |
|---|---|---|---|---|---|
| FIRST FILTER CIRCUIT | 1:2:1 | 0.250 | 0.500 | 0.250 | 2 |
| SECOND FILTER CIRCUIT | 7:18:7 | 0.219 | 0.563 | 0.219 | 4 |
| THIRD FILTER CIRCUIT | 3:10:3 | 0.188 | 0.625 | 0.188 | 4 |
| FOURTH FILTER CIRCUIT | 5:22:5 | 0.156 | 0.688 | 0.156 | 5 |
| FIFTH FILTER CIRCUIT | 1:6:1 | 0.125 | 0.750 | 0.125 | 3 |
| SIXTH FILTER CIRCUIT | 3:26:3 | 0.094 | 0.813 | 0.094 | 5 |
| SEVENTH FILTER CIRCUIT | 1:14:1 | 0.063 | 0.875 | 0.063 | 3 |
| EIGHTH FILTER CIRCUIT | 1:30:1 | 0.031 | 0.938 | 0.031 | 3 |

FIG. 5

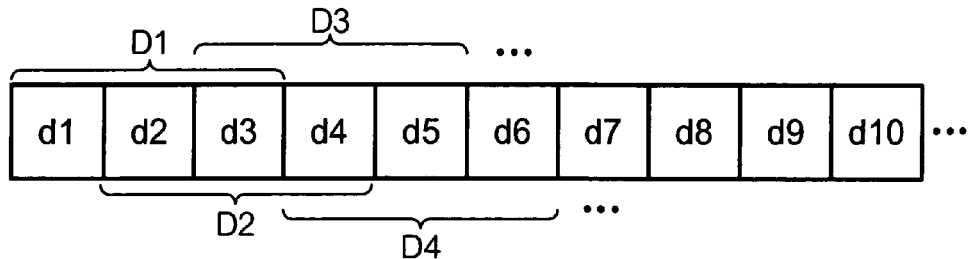

FIG. 6

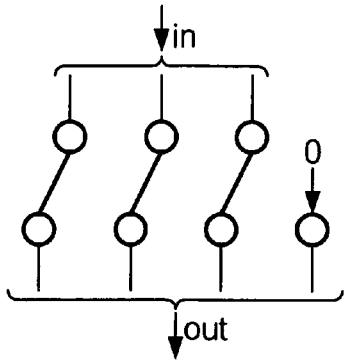

FIG. 8

| | FILTER COEFFICIENT | CIRCUIT CONFIGURATION (EXPRESSED AS EQUATION) |
|---|---|---|
| FIRST FILTER CIRCUIT | 1:2:1 | T=L+R,Z=(T+2C)÷4 |
| SECOND FILTER CIRCUIT | 7:18:7 | T=L+R,Z={(8T-T)+2(C+8C)}÷32 |
| THIRD FILTER CIRCUIT | 3:10:3 | T=L+R,Z={(T+2T)+2(C+4C)}÷16 |
| FOURTH FILTER CIRCUIT | 5:22:5 | T=L+R,Z=[(T+4T)+2{C+2(C+4C)}]÷32 |
| FIFTH FILTER CIRCUIT | 1:6:1 | T=L+R,Z={T+2(C+2C)}÷8 |
| SIXTH FILTER CIRCUIT | 3:26:3 | T=L+R,Z=[(T+2T)+2{C+4(C+2C)}]÷32 |
| SEVENTH FILTER CIRCUIT | 1:14:1 | T=L+R,Z={T+2(8C+C)}÷16 |
| EIGHTH FILTER CIRCUIT | 1:30:1 | T=L+R,Z={T+2(16C-C)}÷32 |

FILTER CIRCUIT, IMAGE PROCESSING CIRCUIT, AND FILTERING METHOD

The entire disclosure of Japanese Patent Application No. 2006-296266 filed on Oct. 31, 2006 is expressly incorporated by reference herein.

BACKGROUND

1. Technical Field

The present invention relates to a technique for smoothing an image through filtering.

2. Related Art

A technique called the dither method is a method for expressing gradation. This dither method is a technique that simulates more gradation by dispersing pixels of plural differing densities to appropriate positions. For example, an image that appears gray (half-tone) overall can be expressed by alternately disposing white pixels and black pixels. By adjusting the number, position, and the like of these white pixels and black pixels, it is possible to continuously express a gradation from white to black.

For example, JP-A-3-105484 and JP-A-6-180568 disclose techniques for smoothing an image through filtering when enlarging or reducing an image in which gradation is expressed through the dither method (called a "dithered image" hereinafter). "Smoothing" is a process in which the contours (edges) of an image are smoothed by reducing the difference in densities between pixels that are adjacent to one another. When an image is enlarged or reduced, there are cases where the contours of the image are accentuated, and thus it is necessary to blur the accentuated contours by performing this smoothing on the image.

There is a problem, however, that the amount of processing for filtering and smoothing a dithered image is very large; when this processing is implemented by software, the processing time and amount of energy consumed is extremely high. Accordingly, when desiring to speed up the processing time in particular, a dedicated hardware filter for filtering may be used. However, there is a problem that while hardware filters are capable of high-speed processing, they use multipliers and dividers that have comparatively higher prices, resulting in high production costs as well as high energy consumption.

Incidentally, when filtering a dithered image in order to smooth the image, there are cases where stages appear in the gradation expressed through the dither method, and so-called "pseudo-contours" arise. For example, as shown in FIG. 9, image data "010", where white pixels are expressed by "0" and black pixels are expressed by "1", is filtered by a three-tap filter configured with a filter coefficient of 2:3:2. In this case, the result of filtering performed on the black pixel "1", which is the target pixel, is $(0 \times 2 + 1 \times 3 + 0 \times 2) \div (2+3+2) = 3 \div 7 = 0.428$. Here, assuming the density of the pixel is found by rounding off the calculation result to the nearest whole number, the density of the black pixel "1" becomes "0" in the example of FIG. 9. Accordingly, due to the filtering, an area that is originally expressed as a light gray changes to an area expressed as white, and the gradation is lost. When occurring in an area in which the gradation continuously changes, this phenomenon is a cause of pseudo-contours.

SUMMARY

A first object thereof is to realize smoothing of an image with a lower cost and lower energy consumption than the case where a multiplier, divider, and the like are used. Furthermore, a second object of the present invention is to suppress the degradation of image quality, such as the occurrence of pseudo-contours, even in the case where filtering for smoothing is performed on the image data.

According to an aspect of the invention, there is provided a filter circuit including: an adder/subtractor that performs at least addition; and a shifter that performs multiplication/division by a power of two through a shift operation. The adder/subtractors and the shifter are configured to obtain a first calculation result representing a pixel value of a target pixel included in image data multiplied by a first filter coefficient. At least the adder/subtractors and the shifter is configured to obtain a second calculation result representing pixel values of a plurality of peripheral pixels adjacent to the target pixel, with each of the pixel values being multiplied by a second filter coefficient. The adder/subtractor is configured obtain a third calculation result by adding the first and second calculation results. The shifter configured to divide the third calculation result by a power of two which is equivalent to a sum of the first and second filter coefficients, so as to output the division result. According to this aspect of the present invention, adders and subtractors, which have a lower cost and lower energy consumption than multipliers and dividers, are used along with shifters. It is therefore possible to realize the smoothing of images at low cost and low energy consumption.

It is preferable that the first filter coefficient divided by the sum of the first filter coefficient and the second filter coefficients is greater than or equal to 0.5. Particularly in the case where there is one target pixel and two peripheral pixels, it is preferable for the ratio between the second filter coefficient, the first filter coefficient, and the second filter coefficient to be at least one of 1:2:1, 7:18:7, 3:10:3, 5:22:5, 1:6:1, 3:26:3, 1:14:1, and 1:30:1. In these cases, the degradation of image quality, such as the occurrence of pseudo-contours, can be suppressed even in the case where filtering for smoothing is performed on the image.

It is preferable that the filter circuit further includes a memory element that temporarily stores the calculation results of the adder/subtractor and the shifter, wherein pipelined processing is performed by the adder/subtractor and the shifter using the memory element. In this case, the speed of the processing can be further increased.

According to another aspect of the invention, there is provided an image processing circuit including: a plurality of filter circuits; and a determination unit that determines characteristics of image data. Each of the plurality of filter circuits includes: an adder/subtractor that performs at least addition; and a shifter that performs multiplication/division by a power of two through a shift operation. The adder/subtractors and the shifter are configured to obtain a first calculation result representing a pixel value of a target pixel included in image data multiplied by a first filter coefficient. At least the adder/subtractors and the shifter are configured to obtain a second calculation result representing pixel values of a plurality of peripheral pixels adjacent to the target pixel, with each of the pixel values being multiplied by a second filter coefficient. The adder/subtractor is configured to obtain a third calculation result by adding the first and second calculation results. The shifter is configured to divide the third calculation result by a power of two, which is equivalent to a sum of the first and second filter coefficients, so as to output the division result. Each of the plurality of filter circuits having a different ratio between the first and second filter coefficients. The plurality of filter circuits selectable based on the characteristics determined by the determination unit. According to this aspect of the invention, an appropriate filter circuit can be used in accordance with the characteristics of the image data, such as whether the image data is, for example, text, graphics, or an image.

According to another aspect of the invention, there is provided a filtering method including: obtaining a first calculation result representing a pixel value of a target pixel included in image data multiplied by a first filter coefficient, through an addition/subtraction and multiplication/division by a power of two; obtaining a second calculation result representing pixel values of a plurality of peripheral pixels adjacent to the target pixel, with each of the pixel values being multiplied by a second filter coefficient, through at least an addition/subtraction and multiplication/division by a power of two; obtaining a third calculation result by adding the first and second calculation results; dividing the third calculation result by a power of two which is equivalent to a sum of the first and second filter coefficients; and outputting the division result. According to this aspect of the invention, adders and subtractors, which have a lower cost and lower energy consumption than multipliers and dividers, are used along with shifters. It is therefore possible to realize the smoothing of images at low cost and low energy consumption.

It is preferable that the first filter coefficient divided by the sum of the first filter coefficient and the second filter coefficients is greater than or equal to 0.5. In this case, the degradation of image quality, such as the occurrence of pseudo-contours, can be suppressed even in the case where filtering for smoothing is performed on the image.

BRIEF DESCRIPTION OF THE DRAWINGS

The invention will be described with reference to the accompanying drawings, wherein like numbers refer to like units:

FIG. 5 shows an example of a layout of pixel values included in image data;

FIG. 6 shows a configuration of a barrel shifter in the first filter circuit;

FIG. 8 shows configurations of the first filter circuit through an eighth filter circuit in the image display apparatus are expressed as equations.

DESCRIPTION OF EXEMPLARY EMBODIMENTS

Figures 1, 2:
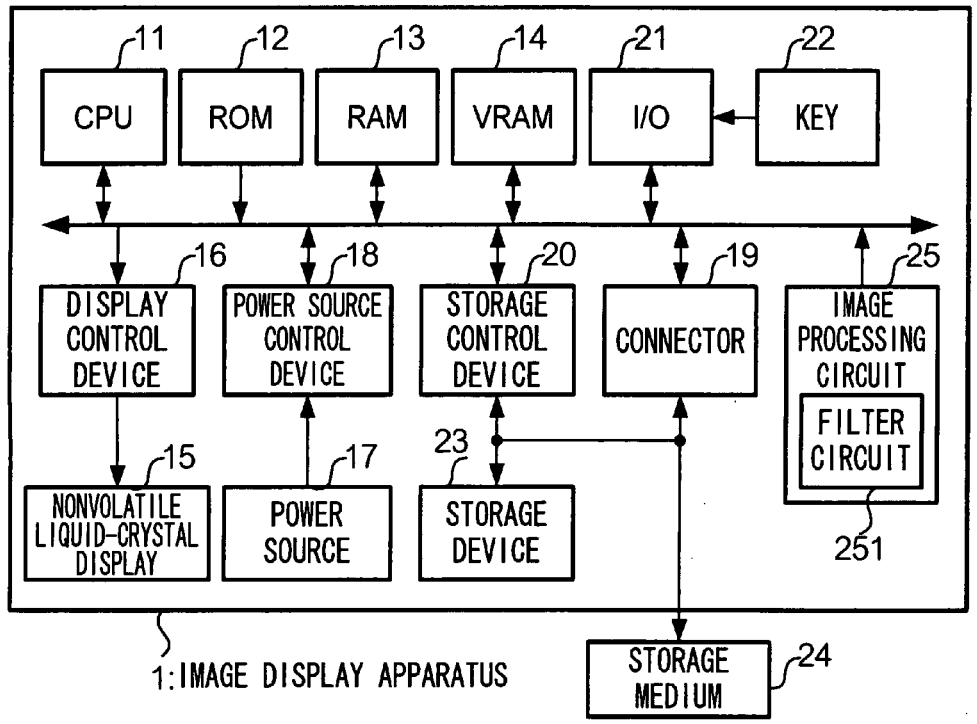
FIG. 1 shows a configuration of an image display apparatus according to an exemplary embodiment of the invention.
FIG. 2 shows filter coefficients used by the image display apparatus.

FIG. 1 is a diagram showing a configuration of an image display apparatus 1 according to the present exemplary embodiment.

As shown in FIG. 1, the image display apparatus 1 includes: a central processing unit (CPU) 11; a read-only memory (ROM) 12; a random access memory (RAM) 13; a video random access memory (VRAM) 14; a nonvolatile liquid-crystal display 15; a display control device 16; a power source 17; a power source control device 18; a connector 19; a storage control device 20; an I/O 21; a key 22; a storage device 23; and an image processing circuit 25. The CPU 11 reads out a control program stored in the ROM 12, expands it in the RAM 13, and executes processing in accordance with the procedure written in the control program. A portable storage medium 24, such as a removable medium, can be attached to/detached from the connector 19. The storage medium 24 may be a card-type storage medium that includes a flash memory, such as, for example, a Secure Digital (SD) card, or may be a disk-type storage medium that uses a magnetic medium, such as, for example, a Floppy® disk.

The storage device 23 is a non-volatile storage unit such as a flash memory or a hard disk. Image data indicating images such as text, graphics, and photograph images is stored in the storage device 23 or the storage medium 24. This image data expresses an image in which gradation is expressed through the dither method (a dithered image). In accordance with instructions from the CPU 11, the storage control device 20 reads out image data from the storage device 23 or the storage medium 24 and transfers the image data to the image processing circuit 25. In accordance with instructions from the CPU 11, the image processing circuit 25 performs image processing such as smoothing, enlargement/reduction, and the like on the image data, and stores the resultant in the VRAM 14. The nonvolatile liquid-crystal display 15 is a display unit that uses cholesteric liquid crystal, electrophoresis, or the like, and has a nonvolatile property through which it is possible to continue displaying an image even after the power supply has been stopped. The image data written into the VRAM 14 is supplied to the display control device 16 under instruction of the CPU 11. The display control device 16 controls the nonvolatile liquid-crystal display 15, causing it to display an image based on the stated image data. The key 22 is an operational unit operated by a user, and includes an operational device such as a pen device, a joystick, or the like. The I/O 21 monitors the operational state of the key 22, and when the key 22 is operated, supplies a signal to the CPU 11 in response to the operation. The power source 17 is, for example, a rechargeable battery; the power source control device 18 performs various types of power source management, such as on/off control of the power source 17, monitoring the remaining power, and so on.

The image processing circuit 25 includes plural filter circuits 251. A dithered image is smoothed by filtering image data using these filter circuits 251. Each of these filter circuits 251 is configured of adders and subtractors, which have a lower cost and consume less energy than multipliers and dividers, as well as barrel shifters and flip-flops. The filter circuits 251 are all three-tap filters, for which there are eight different combinations of filter coefficients. The filter coefficient ratios of each of these eight types of filter circuits (first filter circuit-eighth filter circuit) are, as shown in FIG. 2, "1:2:1", "7:18:7", "3:10:3", "5:22:5", "1:6:1", "3:26:3", "1:14:1"; and "1:30:1".

Among the three filter coefficients in each of the filter circuits 251, the central filter coefficient is a coefficient by which the pixel value of the target pixel is multiplied (a first filter coefficient), and the filter coefficients on the right and left sides are coefficients by which the pixel values of the two peripheral pixels adjacent to the target pixel are multiplied (second filter coefficients). In each of the filter circuits 251, the percentage of the total of all of the filter coefficients that is taken up by the central filter coefficient is always greater than or equal to 0.5 (50%). For example, in the case of the first filter circuit, the filter coefficient ratio is "1:2:1", and thus the percentage of the total of all the filter coefficients, which is 1+2+1="4", taken up by the central filter coefficient "2" is 2÷4, or 0.5 (50%). Similarly, in the case of the second filter circuit, the filter coefficient ratio is "7:18:7", and thus the percentage of the total of all the filter coefficients, which is 7+18+7="32", taken up by the central filter coefficient "18" is 18÷32, or 0.563 (56.3%).

Figure 3:
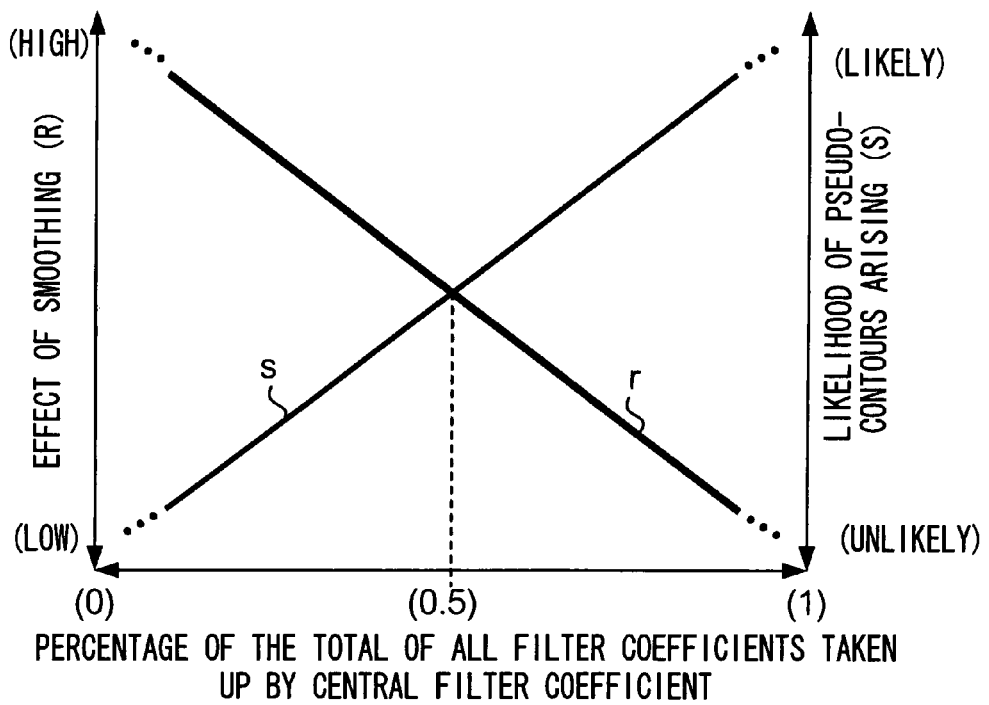
FIG. 3 shows a relationship between the percentage of the total of all filter coefficients taken up by a central filter coefficient, the effect of smoothing, and the likelihood of pseudo-contours occurring.

FIG. 3 is a diagram conceptually showing a relationship between the percentage of the total of all filter coefficients taken up by the central filter coefficient, the effect of smoothing, and the likelihood of pseudo-contours occurring. In FIG. 3, the solid line r expresses the relationship between the percentage of the total of all filter coefficients taken up by the central filter coefficient and the effect of smoothing. In addition, the solid line s expresses the relationship between the percentage of the total of all filter coefficients taken up by the central filter coefficient and the likelihood of pseudo-contours occurring. The larger the percentage of the total of all filter coefficients taken up by the central filter coefficient is, the lower the effect of smoothing becomes. For this reason, the percentage of the total of all filter coefficients taken up by the central filter coefficient and the effect of smoothing are in an almost inverse relationship, as is indicated by the solid line r. On the other hand, because pseudo-contours occur due to the loss of gradation caused by excessive smoothing, the likelihood of pseudo-contours occurring is greater the larger the effect of smoothing is. For this reason, the percentage of the total of all filter coefficients taken up by the central filter coefficient and the level of effectiveness at which pseudo-contours are suppressed are in a generally proportional relationship, as is indicated by the solid line s.

In this manner, while the effect of smoothing becomes lower the closer the percentage of the total of all filter coefficients taken up by the central filter coefficients is to 1 (100%), there is an advantage in that the likelihood of pseudo-contours occurring decreases. As opposed to this, while the effect of smoothing becomes higher the closer the percentage of the total of all filter coefficients taken up by the central filter coefficients is to 0 (0%), there is a disadvantage in that the likelihood of pseudo-contours occurring increases. Taking such advantages and disadvantages into consideration, tests performed by the inventors confirmed that it is preferable for the percentage of the total of all filter coefficients taken up by the central filter coefficient to be greater than or equal to 50% if more importance is to be placed on the suppression of pseudo-contours. It is for this reason that the percentage of the total of all filter coefficients taken up by the central filter coefficient is always greater than or equal to 50% in the aforementioned first through eighth filter circuits. Through this, it is possible to suppress picture quality degradation such as pseudo-contours occurring due to excessive smoothing.

Furthermore, in FIG. 2, the percentage of the total of all filter coefficients taken up by the central filter coefficient is less than that of the filter circuit of a higher level, and greater than that of a filter circuit of a lower level. In other words, the smoothing effect is greater the higher the level of the filter circuit and smaller the lower the level of the filter circuit. The image processing circuit 25 determines the characteristics of the image data (whether the image data is text, graphics, or an image) and selects a filter circuit to be used in smoothing from among the first through eighth filter circuits, in accordance with the results of the determination. For example, if the image data is text or graphics, it is preferable not to smooth and blur the contours. Therefore, the image processing circuit 25 uses a filter circuit in which the smoothing effect is comparatively small (for example, one of the fifth through eighth filter circuits). However, if the image data is an image, gradation with smooth transitions in required. Therefore, the image processing circuit 25 uses a filter circuit in which the smoothing effect is comparatively large (for example, one of the first through the fourth filter circuits). Note that the determination of the characteristics of the image data can be realized through, for example, a method that stores data indicating the image characteristics per piece of image data, a method that analyzes the frequency of the image, or the like.

Next, detailed descriptions of a configuration of a filter circuit 251 shall be provided.

Figure 4:
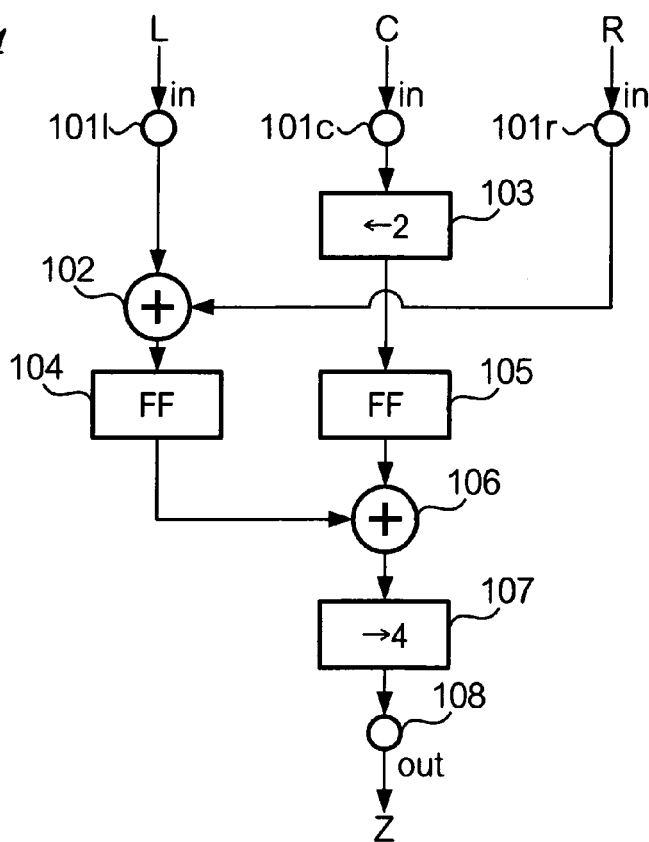
FIG. 4 shows a configuration of a first filter circuit in the image display apparatus.

FIG. 4 is a diagram showing a configuration of the first filter circuit indicated in FIG. 2. As shown in FIG. 4, the first filter circuit includes: three input terminals 101$l$, 101$c$, and 101$r$; two adders 102 and 106; two barrel shifters 103 and 107; two flip-flops 104 and 105; and one output terminal 108. Three pixel values extracted from the image data are inputted into the input terminals 101$l$, 101$c$, and 101$r$. For example, in the case where the pixel values are in a series such as d1, d2, d3, d4, d5, d6, d7, d8, d9, d10 . . . and so on as shown in FIG. 5, the pixel values d1, d2, and d3 are first extracted as a pixel group D1 by the image processing circuit 25. Then, the pixel value d2 is inputted into the input terminal 101$c$ as a pixel value C, which is the target pixel and which is located in the center; the pixel value d1 is inputted into the input terminal 101$l$ as a pixel value L, which is a peripheral pixel located to the left of the target pixel; and the pixel value d3 is inputted into the input terminal 101$r$ as a pixel value R, which is a peripheral pixel located to the right of the target pixel.

The pixel value L and the pixel value R are added by the adder 102, and thus T=L+R. The pixel value C is shifted one digit higher (to the left) as a binary number by the barrel shifter 103. The barrel shifter is a shift operation unit that multiplies or divides an input value by a power of 2 by performing a shift operation. The barrel shifter 103 indicated in FIG. 4 has a configuration that is connected in the state indicated in FIG. 6. The shift operation performed by the barrel shifter 103 is equivalent to multiplying the input value (pixel value C) by "2", and therefore is denoted as "«[] 2" in the diagram. Next, the result "T" of the addition performed by the adder 102 and the result "2C (=2×C)" of the shift operation performed by the barrel shifter 103 are stored in the flip-flops 104 and 105 respectively.

Then, the pixel values d2, d3, and d4 shown in FIG. 5 are extracted as a pixel group D2 by the image processing circuit 25; the pixel value d2 is inputted into the input terminal 101$l$ as the pixel value L, the pixel value d3 is inputted into the input terminal 101$c$ as the pixel value C, and the pixel value d4 is inputted into the input terminal 101$r$ as the pixel value R. Addition and shift operations as described above are performed on these pixel values L, C, and R. Then, almost simultaneously to the calculation results "T" and "2C" stored in the flip-flops 104 and 105 being supplied from the flip-flops 104 and 105 to the adder 106, the next results of the operations performed by the adder 102 and the barrel shifter 103 (the results of addition and shift operations being performed on the pixel values d2, d3, and d4) are stored in the flip-flops 104 and 105.

"T" and "2C" are added by the adder 106 upon being supplied to the adder 106. Then, the addition result "T+2C" is shifted two digits lower (to the right) as a binary number by the barrel shifter 107. This shift operation is equivalent to dividing the pixel value C by "4", and therefore is denoted as "»[] 4" in the diagram. Then, the result (T+2C)÷4 of the shift operation is supplied from the barrel shifter 107 to the output terminal 108, and is outputted as a result "Z" of the calculation performed by the first filter circuit. This value Z indicates a pixel value in which the pixel d2 shown in FIG. 5 has undergone smoothing.

Next, the pixel values d3, d4, and d5 shown in FIG. 5 are extracted as a pixel group D3 by the image processing circuit 25; processing is performed on these pixels by the adder 102 and the barrel shifter 103, and at the same time, operations are performed on the aforementioned pixel group D2 by the adder 106 and the barrel shifter 107. In this manner, the same processing as mentioned above is performed on the pixel group D4 and the pixel groups thereafter, with the position of the target pixel being shifted one place at a time. The flip-flops 104 and 105 temporarily hold the in-progress calculation results while fulfilling a role in pipelining the processing, and through this, the processing for the pixel groups D1, D2, D3, D4, and so on shown in FIG. 5 can be carried out continuously. The speed of the processing is increased through this pipelined processing. Note that the number of stages of this pipelined processing is "2", which is the same as the total number of adders or subtractors, as shown in FIG. 2.

Figure 7:
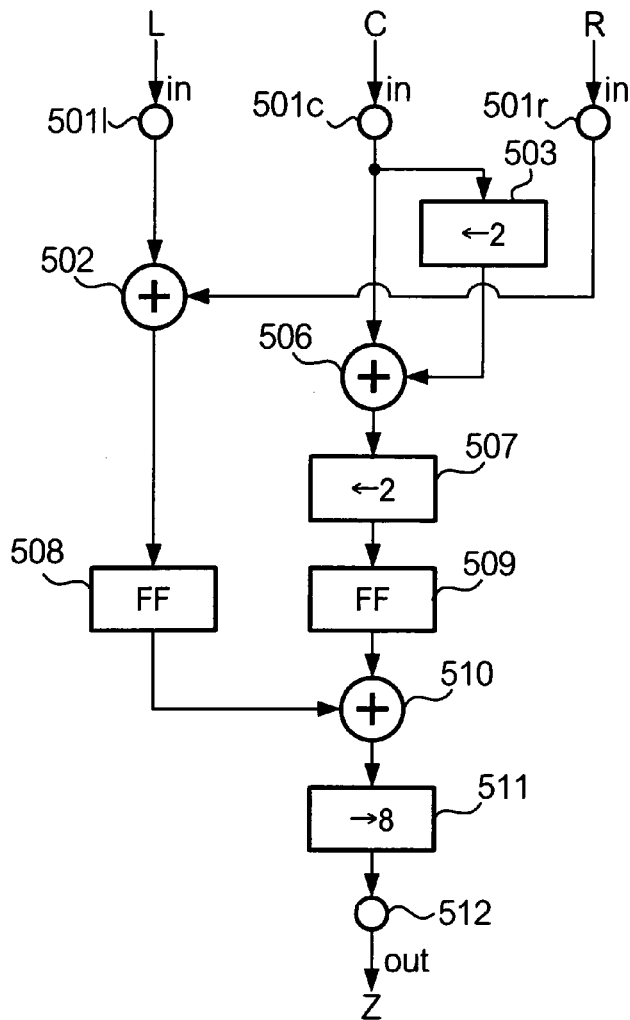
FIG. 7 shows a configuration of a fifth filter circuit in the image display apparatus.
Figure 9:
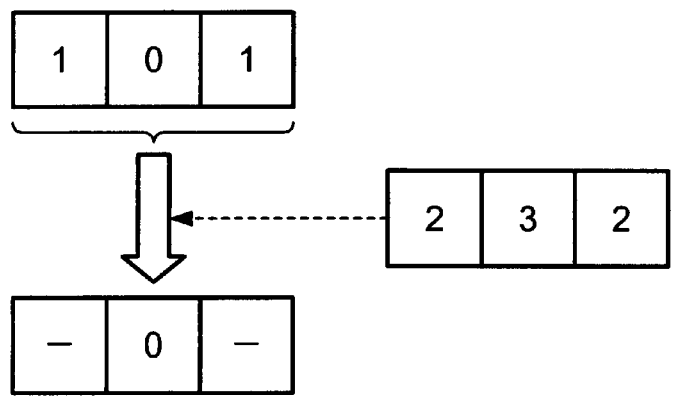
FIG. 9 shows the loss of gradation due to smoothing in a dithered image.

Next, FIG. 7 is a diagram showing a configuration of the fifth filter circuit indicated in FIG. 2.

As shown in FIG. 7, the fifth filter circuit includes: three input terminals 501$l$, 501$c$, and 501$r$; three adders 502, 506, and 510; three barrel shifters 503, 507, and 511; two flip-flops 508 and 509; and one output terminal 512. Similarly to the first filter circuit, three pixel values d1, d2, and d3 extracted from the image data are inputted as pixel values L, C, and R, respectively, into the respective input terminals 501$l$, 501$c$, and 501$r$. The pixel value L and the pixel value R are added by the adder 502, and thus T=L+R. The pixel value C is shifted one digit higher (to the left) as a binary number by the barrel shifter 503. This shift operation is equivalent to multiplying the pixel value C by "2", and therefore is denoted as "←2" in the diagram.

Next, the pixel value C and "2C" supplied from the barrel shifter 503 are added by the adder 506. Then, the result "C+2C" of the addition is shifted one digit higher (to the left) as a binary number by the barrel shifter 507. This shift operation is equivalent to multiplying the pixel value C by "2", and therefore is denoted as "←2" in the diagram. Then, the result "2 (C+2C)" of the shift operation performed by the barrel shifter 507 is stored in the flip-flop 509, and "T" supplied from the adder 502 is stored in the flip-flop 508.

At this time, the pixel values d2, d3, and d4 shown in FIG. 5 are extracted as a pixel group D2 by the image processing circuit 25; the pixel value d2 is inputted into the input terminal 501$l$ as the pixel value L, the pixel value d3 is inputted into the input terminal 501$c$ as the pixel value C, and the pixel value d4 is inputted into the input terminal 501$r$ as the pixel value R. Addition and shift operations as described above are performed on these pixel values L, C, and R. In other words, the flip-flops 508 and 509 fulfill a role in pipelining the processing in the fifth filter circuit as well, and thus the speed of the processing can be increased. Note that the number of stages of this pipelined processing is "2", which is a number less than the total number of adders or subtractors, as shown in FIG. 2.

Next, "T" and "2 (C+2C)" stored in the flip-flops 508 and 509 are supplied to the adder 510 and added. Then, the addition result "T+2 (C+2C)" is shifted three digits lower (to the right) as a binary number by the barrel shifter 511. This shift operation is equivalent to dividing the pixel value C by "8", and therefore is denoted as "→8" in the diagram. Then, the result "{T+2 (C+2C)}÷8" of the shift operation is supplied from the barrel shifter 507 to the output terminal 512, and is outputted as a result "Z" of the calculation performed by the fifth filter circuit. This value Z indicates a pixel value in which the pixel d2 shown in FIG. 5 has undergone smoothing.

Thereafter, in the same manner, the same filtering processing as mentioned above is performed, with the position of the target pixel being shifted one place at a time.

Although the aforementioned FIGS. 4 and 7 illustrate the first filter circuit and the fifth filter circuit, configurations of other filter circuits can easily be realized by modeling the configurations on those of the first filter circuit and the fifth filter circuit. Here, expressing the configurations of the first through eighth filter circuits as equations results in the equations shown in FIG. 8. In FIG. 8, L, C, R, T, and Z are the aforementioned values, and the operator "+" for these values indicates addition performed by an adder, whereas the operator "−" indicates subtracting performed by a subtractor. Multiplication by a power of 2 and division by a power of 2 indicates shift operations performed by a barrel shifter.

For example, using the second filter circuit as an example, "8C", which is the result of shifting the pixel value "C" three digits higher, and the pixel value "C" are added; the result of this addition is shifted one digit higher, and "2 (C+8C)" is obtained thereby. This "2 (C+8C)", or in other words, "18C", is equivalent to the result (first calculation result) of multiplying the pixel value "C" of the target pixel by "18", which is the central filter coefficient (first filter coefficient) in "7:18: 7".

On the other hand, (8T−T) is obtained by subtracting "T" from "8T", which is the result of shifting "T", in which the pixel values "L" and "R" have been added, three digits higher. This "8T−T", or in other words, "7T", is equivalent to the result (second calculation result) of multiplying the total of the pixel values of the peripheral pixels "T" by "7", which is the left and right filter coefficient (second filter coefficient) in "7:18:7".

Shifting the result of adding these, or {(8T−T)+2 (C+8C)}, five digits lower results in Z={(8T−T)+2 (C+8C)}÷32. This is equivalent to the result of adding the aforementioned first calculation result and second calculation result together and dividing this addition result by a power of 2 (in this case, $2^5$=32), which is equivalent to the total of the filter coefficients 7, 18, and 7.

In other words, all of the filter circuits indicated in FIG. 8 perform filtering through the following procedure. First, a first calculation result, in which the pixel value "C" of the target pixel is multiplied by the first filter coefficient, is obtained by addition performed by an adder or subtraction performed by a subtractor, or by a shift operation performed by a barrel shifter. In addition, a second calculation result, in which the pixel values L and R of the plural peripheral pixels are respectively multiplied by the second filter coefficient, is obtained by addition performed by the adder or subtraction performed by the subtractor, or by a shift operation performed by the barrel shifter. Then, the first calculation result and second calculation result are added together, the addition result is divided by a barrel shifter by a power of 2, which is equivalent to the total of the filter coefficients, and the division result is outputted.

According to the exemplary embodiment described thus far, the filter circuits 251 are configured using adders, subtractors, and barrel shifters, rather than using multipliers and dividers, making it possible to realize a lower cost and lower energy consumption than a conventional filter circuit. Furthermore, because adders and subtractors perform processing faster than multipliers and dividers, and because the processing is pipelined through the use of flip-flops, it is possible to speed up the filtering process. Speeding up the processing and reducing the energy consumption is of considerable significance particularly in the case where the image display apparatus 1 operates on a power source 17 with low capacity, such as a battery. The present exemplary embodiment can address both of these issues.

In addition, according to the present exemplary embodiment, the percentage of the total of all filter coefficients taken up by the filter coefficient by which the pixel value C of the target pixel is multiplied (the first filter coefficient) is, in the filter circuits 251, always greater than or equal to 50%. Accordingly, it is possible to maintain gradation expressed through the dither method while suppressing picture quality degradation such as pseudo-contours. Furthermore, according to the present exemplary embodiment, it is possible to use the appropriate filter circuit 251 in accordance with the characteristics of the image (text, graphics, or an image).

The following variations may be made on the aforementioned exemplary embodiment.

Filtering may be performed simultaneously by all filter circuits 251 shown in FIG. 2, and an appropriate result may be selected and used from among the plural filtering results. In this case, the number of adders and subtractors that can be used will change depending on the allowable computation time, cost constraints, and so on. Therefore, the configuration of the filter circuits 251 that are used will also change. For example, if using five adders and subtractors is allowable, all of the filter circuits 251 shown in FIG. 2 can be used. In this case, the image processing circuit 25 is capable of selecting from among eight types of calculation results (pixel values). Furthermore, when the option of not performing filtering by the filter circuits 251 is taken into consideration, it is possible to select nine types of pixel values.

In addition, if using four adders and subtractors is allowable, the filter circuits 251 shown in FIG. 2 having four or less adders and subtractors, or in other words, the first through third, fifth, seventh, and eighth filter circuits, can be used. In this case, the image processing circuit 25 is capable of selecting from among six types of calculation results (pixel values). Furthermore, when the option of not performing filtering by the filter circuits 251 is taken into consideration, it is possible to select seven types of pixel values.

Furthermore, if using three adders and subtractors is allowable, the filter circuits 251 shown in FIG. 2 having three or less adders and subtractors, or in other words, the first, fifth, seventh, and eighth filter circuits, can be used. In this case, the image processing circuit 25 is capable of selecting from among four types of calculation results (pixel values). Furthermore, when the option of not performing filtering by the filter circuits 251 is taken into consideration, it is possible to select five types of pixel values.

The technology described in the exemplary embodiment is applicable in an image display device that displays dithered images, and can be applied in highly-portable display units such as so-called electronic paper, as well as in liquid-crystal displays of personal computers, personal digital assistants (PDAs), and the like.

As described earlier, to prevent image quality degradation while maintaining the gradation of a dithered image, the percentage of the total of all filter coefficients taken up by the filter coefficient by which the pixel value of the target pixel is multiplied may be, in the filter circuits 251, always greater than or equal to 50%. Such a filtering method is not limited to a filter circuit as described in the exemplary embodiment (i.e. a hardware circuit), and can also be realized by software that can be executed by the CPU 11. The following steps, performed by the CPU 11, are written in this software: obtaining a first calculation result by multiplying the pixel value of a target pixel included in image data by a first filter coefficient; obtaining a second calculation result by multiplying the pixel values of plural peripheral pixels by second filter coefficients, respectively; and adding the first calculation result and the second calculation result, dividing the addition result by the sum of the first filter coefficient and the plural second filter coefficients, and outputting the division result. Furthermore, this software (program) can be furnished in a state in which it is recorded onto a storage medium such as magnetic tape, a magnetic disk, a Floppy® disk, an optical storage medium, a magneto-optical storage medium, a Compact Disk (CD), a Digital Versatile Disk (DVD), a RAM, or the like.

What is claimed is:

1. A filter circuit comprising:
a plurality of adders/subtractors that perform at least addition/subtraction; and
a plurality of shifters that perform multiplication/division by a power of two through a shift operation,
at least one adder/subtractor and at least one shifter configured to obtain a first calculation result representing a pixel value of a target pixel included in image data multiplied by a first filter coefficient;
at least one adder/subtractor configured to obtain a second calculation result representing pixel values of a plurality of peripheral pixels adjacent to the target pixel with each of the pixel values being multiplied by a second filter coefficient;
at least one adder configured to obtain a third calculation result by adding the first and second calculation results; and
at least one shifter configured to divide the third calculation result by a power of two which is equivalent to a sum of the first and second filter coefficients, so as to output the division result,
wherein the filter circuit is configured so that the first and second filter coefficients can be selected to have varying values, and the filter circuit is configured to use five or fewer adders/subtractors to calculate the first, second and third calculation results, the number of adders/subtractors used depending on the values of the first and second filter coefficients.

2. The filter circuit according to claim 1,
wherein the first filter coefficient divided by the sum of the first filter coefficient and the second filter coefficients is greater than or equal to 0.5.

3. The filter circuit according to claim 2,
wherein two peripheral pixels for a single target pixels are provided; and
the ratio between the second filter coefficient, the first filter coefficient, and the second filter coefficient is selected from 1:2:1, 7:18:7, 3:10:3, 5:22:5, 1:6:1, 3:26:3, 1:14:1, and 1:30:1.

4. The filter circuit according to claim 1, further comprising:
a memory element that temporarily stores the calculation results of the adder/subtractor and the shifter,
wherein pipelined processing is performed by the adder/subtractor and the shifter using the memory element.

5. A filtering method comprising:
selecting values of a first filter coefficient and a second filter coefficient from among a plurality of filter coefficient values;
obtaining a first calculation result representing a pixel value of a target pixel included in image data multiplied by the first filter coefficient, through an addition/subtraction and multiplication/division by a power of two;
obtaining a second calculation result representing pixel values of a plurality of peripheral pixels adjacent to the target pixel each of the pixel values multiplied by the second filter coefficient, through at least an addition/subtraction;

obtaining a third calculation result by adding the first and second calculation results, wherein the steps of obtaining the first, second and third calculation results comprise five or fewer addition/subtraction operations and the number of addition/subtraction operations used depends on the selected values of the first and second filter coefficients;

dividing the third calculation result by a power of two which is equivalent to a sum of the first and second filter coefficients; and outputting the division result.

6. The filtering method according to claim 5,
wherein the first filter coefficient divided by the sum of the first filter coefficient and the second filter coefficients is greater than or equal to 0.5.

7. The Filter circuit according to claim 1, wherein the filter circuit is configured to use from two to five adders/subtractors to calculate the first, second and third calculation results, the number of adders/subtractors depending on the ratio between the first and second filer coefficients.

8. The filter circuit according to claim 7, wherein the filter circuit is configured to use five adders/subtractors to calculate the first, second and third calculation results.

9. The filter circuit according to claim 3, wherein the ratio between the second filter coefficient, the first filter coefficient, and the second filter coefficient is selected from 7:18:7, 3:10:3, 5:22:5, 1:6:1, 3:26:3, 1:14:1, and 1:30:1.

* * * * *